United States Patent Office.

THEODOR PIXIS, OF MUNICH, BAVARIA, GERMANY.

METHOD OF PRODUCING PHOTOCHROMIC PICTURES OR PRINTS.

SPECIFICATION forming part of Letters Patent No. 241,061, dated May 3, 1881.

Application filed February 12, 1881. (Specimens.) Patented in France August 27, 1880.

*To all whom it may concern:*

Be it known that I, THEODOR PIXIS, a subject of the King of Bavaria, residing at Munich, in the Kingdom of Bavaria and Empire of Germany, have invented certain new and useful Improvements in the Method of Producing Photochromic Pictures or Prints, (for which I have obtained a patent in France, No. 138,427, bearing date August 27, 1880,) of which the following is a specification.

The object of the present invention is to obtain photochromic pictures which are faithful reproductions of original pictures or paintings and possess all the characteristics of the latter both as to appearance and blending of the various tints or colors.

Prior to my invention it has been proposed to obtain pictures printed in two or more colors by producing as many photographic negatives from the same subject as there are colors in the picture to be printed, these negatives being stopped out or otherwise treated for preparing a corresponding number of gelatinous printing-forms, so as to adapt the same for receiving the various inks or colors required for the reproduction of the picture.

In this process the printing-forms, each inked with a different color, are successively applied to the paper or surface on which the picture is to appear, so as to cause each form to apply its color on different parts of the surface until the entire picture is completed.

It will be manifest that the use of a series of printing-forms requires great care and skill in order to insure a perfect registration thereof, and even when this is the case the various colors or impressions, when assembled together, frequently show defective junctures or an imperfect blending thereof. These results are due to the fact that the colors are not superimposed or laid one upon the other, as in the well-known process of chromolithographic printing; but the different colors are designed to give the solid effects, the shadows, and the half-shades by a careful arrangement thereof or a perfect registration of the different impressions. Such results cannot always be achieved, and even then the finished picture does not present the appearance of a complete fac-simile of the original as to the details of execution and finish.

In the process stated all the steps are of a mechanical nature, and it does not differ from chromolithography except as to the nature and manner of preparing the printing-forms.

Colored photographic pictures in which the colors are applied by hand or mechanical means to sheets of paper, which are subsequently albumenized and sensitized in a silver-bath, have also been proposed; but in this instance the colored photographic proof is exposed under a prepared negative until the solid effects are produced and the half-shades perfectly formed. In other words, the colors are covered by and appear through a superposed sensitive film, on which the solid effects and shades of the picture are produced. A picture prepared in this manner may be a faithful representation of an original, but it lacks permanency, because it involves the use of the fugitive chemicals used in the art of photographic printing, and an exposure of the colors to the bath of chemicals is very liable to impair the nature thereof, and many colors cannot be used at all in carrying out the process.

The present invention consists in the production of a photochromic picture which is true to the original from which it is taken, and can be made to present the appearance of an oil-painting, when oil-colors are used for preparing the groundwork of the picture.

In carrying my invention into practice I paint the groundwork of a picture or design on any suitable material—such as canvas, wood, leather, stone, or paper—using for the preparation of such groundwork oil, water, pastel, or crayon colors. The colors used are applied by means of a brush, and a stencil or pattern plate may be used when multiple prints are to be produced.

In order to show the outlines for guidance in applying the colors, a simple tracing or a feeble outline-print may be put on the material. This outline-print or tracing must be of the same size or contour as the design or image borne by a photographically-prepared printing-plate, which is used at a subsequent stage of the process. The application of the colors requires little skill, because no attention need be paid to the half-shades and shadows, and hence it is even possible to apply the colors by an impression made mechanically by the ordinary means of chromolithography.

After the groundwork or body-colors have been applied in the manner stated the colored plate or surface is ready for the second step of the process. This consists in bringing out the interior forms and the fine mezzotints of the picture by printing upon the colored surface by means of a phototype-plate or printing-form, which is prepared by exposing a sensitized gelatinous printing form or film under a negative taken from the original to be produced. I prepare the printing-form in the well-known manner; but instead of using the ordinary inks and making an impression on a white or uncolored surface, I employ an ink containing a good siccative—such as Japan gold-size—and print directly upon the prepared surface, so as to attain the results above stated.

It will be manifest that the design or image on the printing-form must register with the colored or painted groundwork, and this, as already stated, I accomplish by making the groundwork and design on the printing-plate of the same size or contour and using the necessary care in making the impression.

The inks used for inking the forms may be of any suitable tint, and in many instances I make use of two tints for one picture. For example, the deep shadows are in a strong brown color and the mezzotint is in a grayish or bluish color.

The presence of a siccative in the printing-ink is highly essential in carrying out my process, because said ink must be made to dry quickly and thoroughly.

No other steps except those above mentioned need be necessary to produce a finished picture in which the colors are properly brought out and blended, as in the original, of which it is a perfect copy; but the effect can be further increased by retouching or toning the picture by hand and glazing the painted and printed surface, as is commonly practiced in finishing oil-paintings.

Having thus described my invention, what I claim as new, and desire to secure by Letters Patent, is—

1. The method herein described of producing photochromic pictures, consisting in forming the groundwork of the picture in suitable colors or pigments and then printing directly upon said colored groundwork with a phototype-plate bearing a design or image corresponding in size and contour with said colored groundwork, and inked so as to register with the latter when impressed thereupon for bringing out the solid effects, the shadows, and the half-shades of the picture, substantially as and for the purpose set forth.

2. A photochromic picture consisting of a colored or painted groundwork or body-colors applied to give the general outlines of said picture and a superposed coating of permanent colors or inks printed upon said groundwork to bring out the solid effects, the shadows, and half-shades of the picture, as and for the purpose set forth.

THEODOR PIXIS.

Witnesses:
FRANZIS POSSAROKA,
EMIL HAASE.